J. LEDWINKA.
METHOD OF ELECTRICALLY WELDING GALVANIZED METAL SHEETS OR PARTS.
APPLICATION FILED JAN. 28, 1919.
1,414,822. Patented May 2, 1922.
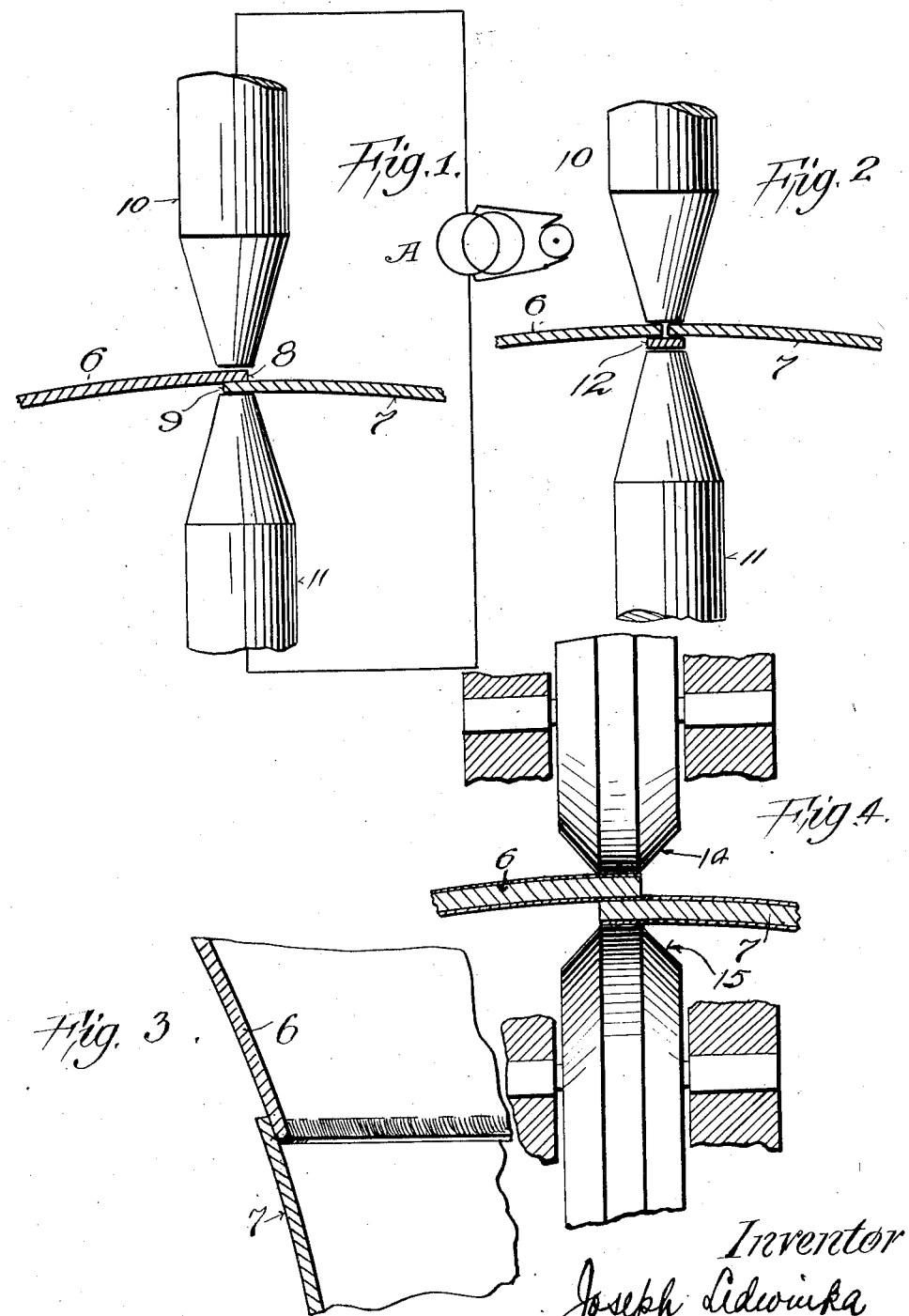
Inventor
Joseph Ledwinka
by his atty Samuel E Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

METHOD OF ELECTRICALLY WELDING GALVANIZED METAL SHEETS OR PARTS.

1,414,822.  Specification of Letters Patent.  Patented May 2, 1922.

Application filed January 28, 1919. Serial No. 273,576.

*To all whom it may concern:*

Be it known that I, JOSEPH LEDWINKA, a citizen of the United States, residing at Philadelphia, county of Philadelphia, State of Pennsylvania, have made a certain new and useful Invention in Method of Electrically Welding Galvanized Metal Sheets or Parts, of which the following is a specification.

This invention relates to a method of electrically welding together galvanized metal sheets, plates, or other parts.

The object of the invention is to provide a method of welding together metal sheets, plates, or parts, of the character referred to, which is simple, efficient, and practical, and which can be carried out commercially, satisfactorily, and economically, and without requiring the use of skilled labor.

The invention consists substantially in the steps of procedure and mode of operation, all as will be more fully hereinafter set forth and explained, as illustrated in the accompanying drawing, and finally pointed out in the appended claims.

I have discovered that thin galvanized metal sheets, plates, strips, and the like, such as terne-plate, tin plate, and practically any thin sheet steel plate or strip which has been covered or coated with a softer metal, such as lead, tin, zinc, bismuth, &c., can be successfully welded together, electrically. I am familiar with the electric welding processes now generally employed for joining together sheet steel plates, strips, or the like, the present almost universal practice being to employ the so-called "spot" welding. I am aware that "butt" welding of sheet steel has also been employed to some extent, and that "lap" or "seam" welding, electrically, has been attempted in connection with sheet steel plates, but this latter operation has not been satisfactory nor attended with any great degree of commercial success. But, so far as I am aware, no commercial success has ever been realized in electrically welding together galvanized metal sheets, or plates.

One difficulty heretofore encountered in the attempts to make a leak-proof seam weld or joint, electrically, in joining together sheet steel plates, is that, ordinarily, roller forms of electrodes are employed, the sheets to be joined, lapped upon each other, being progressed through or between pairs of such roller electrodes, the latter axially turning as the progression takes place, to traverse the line of the seam to be formed. The roller electrodes rotating in contact with the surface of the steel plates to be joined pick up particles of the steel, and these steel particles are carried around on the surfaces of the rollers until they again come in contact with the sheet steel and burn holes in the plate surface. It has also been found that the rollers are erratic in their action, that is, the welding action is not constant nor uniform, a good weld being accomplished for a short distance, and then, for a space, the welding action is interrupted.

I have found that these and other objections may be overcome in connection with galvanized sheet steel plates, strips, &c., and that such articles may be just as easily, readily and satisfactorily welded together electrically, even in butt, lap and continuous seam welds, as in the case of the ordinary electric spot welding of sheet steel.

My invention is based on the discovery that by exposing a portion, or portions, of the steel surfaces of the parts to be welded at the point or points where the weld is to be made, that is, by exposing such surfaces through the galvanizing or other coating of the parts, the application of electric welding electrodes to the parts to be joined in the region of the exposed surfaces, in the presence of the galvanizing or coating material, results in forming a perfect and entirely satisfactory weld, whether it be a spot, a butt, a lap, or a seam weld. I have discovered that the zinc, for example, on the galvanized sheets appears to act as a flux under the influence of the welding heat, with the result that a much better and stronger weld is more easily and satisfactorily secured, than is possible even with the ordinary electric spot welding process applied to steel plates. Unless the steel surface is exposed through the galvanizing material or other coating a practical weld is not secured. I have found in the practical application of my invention, that merely shearing off the adjacent edges of two overlapping thin galvanized sheets or strips affords a sufficient exposure of the steel body through the galvanizing or coating material for all practical purposes.

I have discovered in the practical use of my invention, that only a comparatively limited overlapping area of the galvanized sheets or strips to be welded together is permissible. For example, if the galvanized sheets, or other parts to be welded together, are overlapped more than one-eighth of an inch, a satisfactory weld is not secured.

I have found that my invention is especially well adapted for seam welding where the joint between two parts welded together is rendered leak-proof. This result is attained by forming a number of separate spot welds along the overlapping edges of the parts to be joined, the welding spots occurring successively in close relation to each other. In this case the zinc or other galvanizing material or coating of the parts appears to spread over, cover and fill the welds and the spaces between adjacent welds, thereby producing a substantially continuous seam which is leak-proof, and which will not rust. The same seam weld result may also be attained by the use of roller electrodes between which the overlapping galvanized parts to be joined are progressed. The surfaces of the parts containing the galvanizing or other coating prevent the electrode rollers from picking up small particles of steel which in the axial rotation of the rollers might be again brought into contact with the surface of the plates and cause holes to be burned into the steel plate surfaces which is the case with former efforts to employ roller electrodes in making seam welds. In carrying out my process for making seam welds I am enabled to employ copper electrode rollers and no steel particles will collect thereon. In this case the zinc or other galvanizing material or coating seems to form something in the nature of a lubricant between the contacting surfaces of the roller electrodes and the galvanized parts to be joined, thereby aiding and expediting the operation as well as eliminating the picking up of fine steel particles and the resulting objections thereto.

I have also found that overlapped galvanized sheets or strips may be united together electrically in accordance with my invention, by reducing the current ordinarily required to effect an electric weld, thereby reducing the heat developed between the welding electrodes. The reduced heat effects a soldering action rather than a true welding action. In other words the sheets or strips become joined together by an action analogous to that of soldering except that the action is accomplished electrically at a reduced temperature, and no solder material is employed. Apparently only the zinc or other galvanizing material or coating of the two pieces in contact with each other becomes united or flows together. This soldering method may be employed either in spot welding application, or in seam welding application with excellent and satisfactory results.

In the drawing,—

Fig. 1 is a view illustrating the manner of carrying out my process in electrically uniting overlapped galvanized sheets.

Fig. 2 is a view illustrating the application of my invention in joining together edge to edge two galvanized sheets.

Figs. 3 and 4 are views illustrating the application of my invention to seam welding.

Referring to Fig. 1 the two galvanized sheets 6, 7, are overlapped for a limited area at their adjacent edges, after shearing said sheets along their edges 8, 9, and the two electrodes 10, 11, are then brought together, endwise, with the overlapped portions of the sheets between them, thereby accomplishing the desired weld when current is supplied to the circuit of the electrodes in the usual manner. I have indicated at A a source of supply of current to the electrodes.

In Fig. 2 the sheared edges of the galvanized sheets 6, 7, are abutted together, and a strip 12, which is also sheared at its edges, is placed over the joint. The electrodes 10, 11, are then brought together with the abutting edges of the sheets and the overlapping strip between them. Current is then supplied to the circuit of the electrodes in the usual manner.

In Figs. 3 and 4, the overlapping galvanized sheets 6, 7, are joined together by an electrically welded or soldered seam or continuous joint. In this form the rollers 14, 15, forming the welding or soldering electrodes, are disposed on opposite sides of the overlapping edges of the sheets, and relative progression of the sheets and rollers, with the latter clamped against the opposite sides of the overlapping edges of the sheets, and with current supplied to the circuit containing the roller electrodes, results in producing the desired seam joint, whether it be a true welded joint or a soldered joint, that is, whether a welding or a soldering current is employed. In either case a continuous seam joint is produced which is entirely satisfactory and leakproof, without difficulty or interruption in the welding or soldering action throughout the entire extent of the seam.

The process of my invention finds practical application in the joining together of a vast number of different articles made of galvanized or coated material which have heretofore been joined together by clinching or ordinary soldering, which latter requires the use of solder, and therefore the resulting article is incapable of use in many situations where the solder is likely to melt off.

The joint formed in accordance with my invention is very strong and durable, and, as above indicated, the joint, whether of welded, or soldered characteristic, may be formed into a continuous, or substantially continuous seam, which is leakproof.

By the term "galvanized sheets or parts," I refer to sheets or parts to which a metallic coating has been applied, including such products as terne plate, tin plate, etc., and I am not to be restricted to sheets or parts to which a coating of zinc or spelter has been applied.

Having now set forth the objects and nature of my invention, and the method of carrying the same into practical operation, what I claim as new and useful, and of my own invention, and desire to secure by Letters Patent, is,—

1. The method of electrically joining together galvanized sheets or parts, which consists in first exposing a portion of the body of the parts to be joined, through the galvanizing or other coating thereof, and then applying an electric current through the parts in the region of the exposed portions of the body.

2. The method of electrically joining together galvanized sheets or parts, which consists in first shearing off the edges of the parts to be joined to expose the body of the parts, then lapping the sheared edges upon each other and finally applying an electric current through the parts in the region of the sheared and lapped edges.

3. The method of electrically joining together galvanized sheets or parts which consists in first shearing off the edges to be joined, and then applying to such sheets or parts in the region of the sheared edges thereof an electric current of small volume.

4. The method of electrically joining together metal sheets or parts which consists in coating the parts to be joined with a softer metal, then exposing a portion of the body of the coated parts at the edges thereof, and finally applying an electric current through the parts in the region of the exposed parts of the body thereof.

5. The method of electrically joining together galvanized steel parts which consists in exposing portions of the steel body of the parts at the edges thereof through the galvanizing material, then lapping the edges of the parts to be joined through a limited area thereof, and finally applying electrodes on opposite sides of the lapped parts in proximity to their exposed edges.

6. The method of electrically joining together galvanized metal parts which consists in first exposing the metal parts to be joined through the galvanizing coating thereof at the points to be joined, and then electrically heating the parts at the exposed points.

7. The method of electrically joining together galvanized metal parts which consists in first exposing portions of the surfaces to be joined of the metal parts, through the galvanizing coating thereof, and then electrically heating the parts to be joined at successive closely adjacent points along the exposed area.

8. The method of electrically joining together galvanized metal parts which consists in first exposing portions of the surfaces to be joined of the metal parts, through the galvanizing coating thereof, then lapping the exposed portions the one upon the other, and electrically heating the lapped portions at successive closely adjacent points to form a continuous leakproof seam joint.

9. The method of electrically joining together galvanized metal parts which consists in first shearing the edges of the parts to be joined, then lapping the sheared edges the one upon the other, and finally applying an electric current of low volume to the lapped portions.

10. The method of electrically joining together galvanized metal parts which consists in first shearing the edges of the parts to be joined, then lapping the sheared edges the one upon the other, and electrically heating the lapped portions at successive closely adjacent points to form a continuous leakproof seam joint.

11. The method of electrically joining together galvanized metal parts which consists in first exposing portions of the surfaces to be joined, through the galvanizing coating thereof, then lapping the exposed portions upon each other over a limited area thereof and finally applying an electric current of low volume to and progressing the lapped portions to form a seam joint.

12. The method which consists in first shearing the edges of galvanized metal parts to be joined together, then lapping the sheared edges upon each other, and finally applying an electric current of low volume to and progressing the lapped portions to form a seam joint.

In testimony whereof I have hereunto set my hand on this 21st day of November, A. D. 1918.

JOSEPH LEDWINKA.